(12) United States Patent
Kennouche et al.

(10) Patent No.: US 12,250,658 B2
(45) Date of Patent: Mar. 11, 2025

(54) UTILIZING MACHINE LEARNING MODELS TO ESTIMATE USER DEVICE SPATIOTEMPORAL BEHAVIOR

(71) Applicant: VIAVI Solutions Inc., San Jose, CA (US)

(72) Inventors: Takai Eddine Kennouche, Meylan (FR); Christopher Michael Murphy, Bath (GB); Howard John Thomas, Stonehouse (GB)

(73) Assignee: VIAVI Solutions Inc., Chandler, AZ (US)

( * ) Notice: Subject to any disclaimer, the term of this patent is extended or adjusted under 35 U.S.C. 154(b) by 433 days.

(21) Appl. No.: 17/656,633

(22) Filed: Mar. 25, 2022

(65) Prior Publication Data

US 2023/0309053 A1   Sep. 28, 2023

(51) Int. Cl.
*H04W 64/00* (2009.01)
*G01S 5/00* (2006.01)
(Continued)

(52) U.S. Cl.
CPC ......... *H04W 64/003* (2013.01); *G01S 5/0063* (2013.01); *G01S 5/0294* (2013.01);
(Continued)

(58) Field of Classification Search
CPC . H04W 64/003; H04W 64/006; H04W 24/02; H04W 24/10; G01S 5/0063;
(Continued)

(56) References Cited

U.S. PATENT DOCUMENTS 11,017,661 B1 * 5/2021 Beauchamp ............ H04W 4/44
11,780,472 B2 * 10/2023 Li .......................... G06N 3/045
701/23
(Continued)

FOREIGN PATENT DOCUMENTS

EP   3869219 A1   8/2021

OTHER PUBLICATIONS

Kleinmeier et al., "Vadere: An open-source simulation framework to promote interdisciplinary understanding," Technical University of Munich, Department of Informatics, Jul. 16, 2019, 18 Pages.
(Continued)

*Primary Examiner* — Julio R Perez
(74) *Attorney, Agent, or Firm* — Harrity & Harrity, LLP

(57) ABSTRACT

A device may receive a first type of data identifying measurements associated with user devices and/or base stations of a mobile radio environment, and a second type of data identifying spatiotemporal behavior associated with the user devices. The device may train a first model, with the first type of data, to generate a trained first model that yields dimensionality-reduced spatiotemporal characteristics of the first type of data, and may train a second model, with the second type of data and the dimensionality-reduced spatiotemporal characteristics, to generate a trained second model. The device may receive particular data identifying measurements associated with a user device and/or base stations, and may process the particular data, with the trained first model, to generate a dimensionality-reduced spatiotemporal characteristic of the particular data. The device may process the dimensionality-reduced spatiotemporal characteristic, with the trained second model, to predict a spatiotemporal behavior of the user device.

20 Claims, 12 Drawing Sheets

(51) Int. Cl.
    *G01S 5/02* (2010.01)
    *G06N 3/045* (2023.01)
    *G06N 3/088* (2023.01)

(52) U.S. Cl.
    CPC ............ *G06N 3/045* (2023.01); *G06N 3/088* (2013.01); *H04W 64/006* (2013.01)

(58) Field of Classification Search
    CPC ...... G01S 5/0294; G06N 3/045; G06N 3/088; G06N 3/047; G06N 3/084; G06N 3/0455
    See application file for complete search history.

(56) References Cited

U.S. PATENT DOCUMENTS

| | | | |
|---|---|---|---|
| 2020/0017117 A1 | 1/2020 | Milton | |
| 2020/0182995 A1* | 6/2020 | Zeng | G01S 13/003 |
| 2021/0097387 A1* | 4/2021 | Chidlovskii | G06N 3/045 |
| 2021/0227223 A1* | 7/2021 | Santamaria-Pang | H04N 19/136 |
| 2022/0227360 A1* | 7/2022 | Delhaye | H04W 4/44 |
| 2023/0309053 A1* | 9/2023 | Kennouche | G01S 5/0294 |

OTHER PUBLICATIONS

Extended European Search Report for Application No. EP23163863, mailed on Jun. 1, 2023, 7 pages.

\* cited by examiner

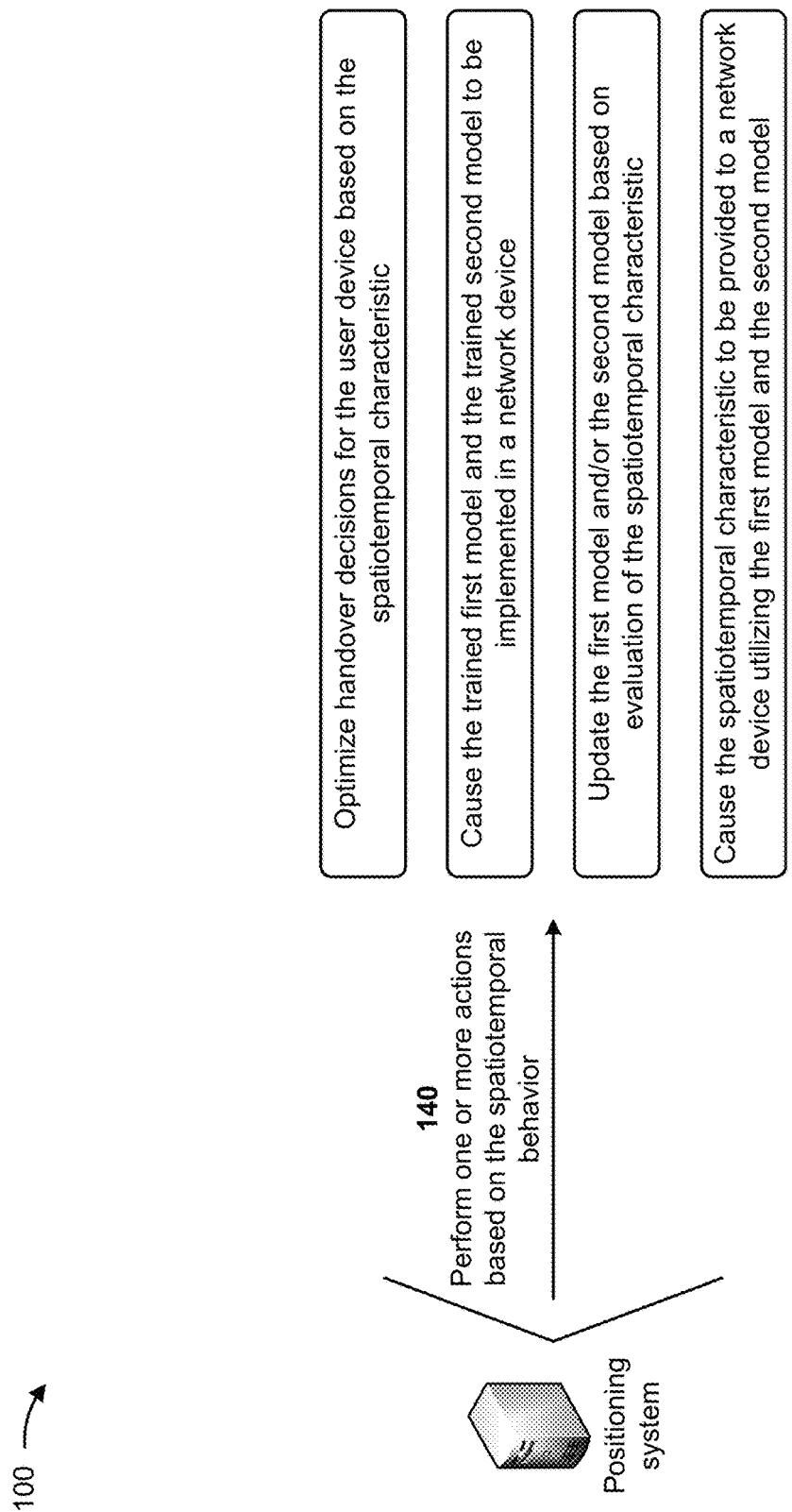

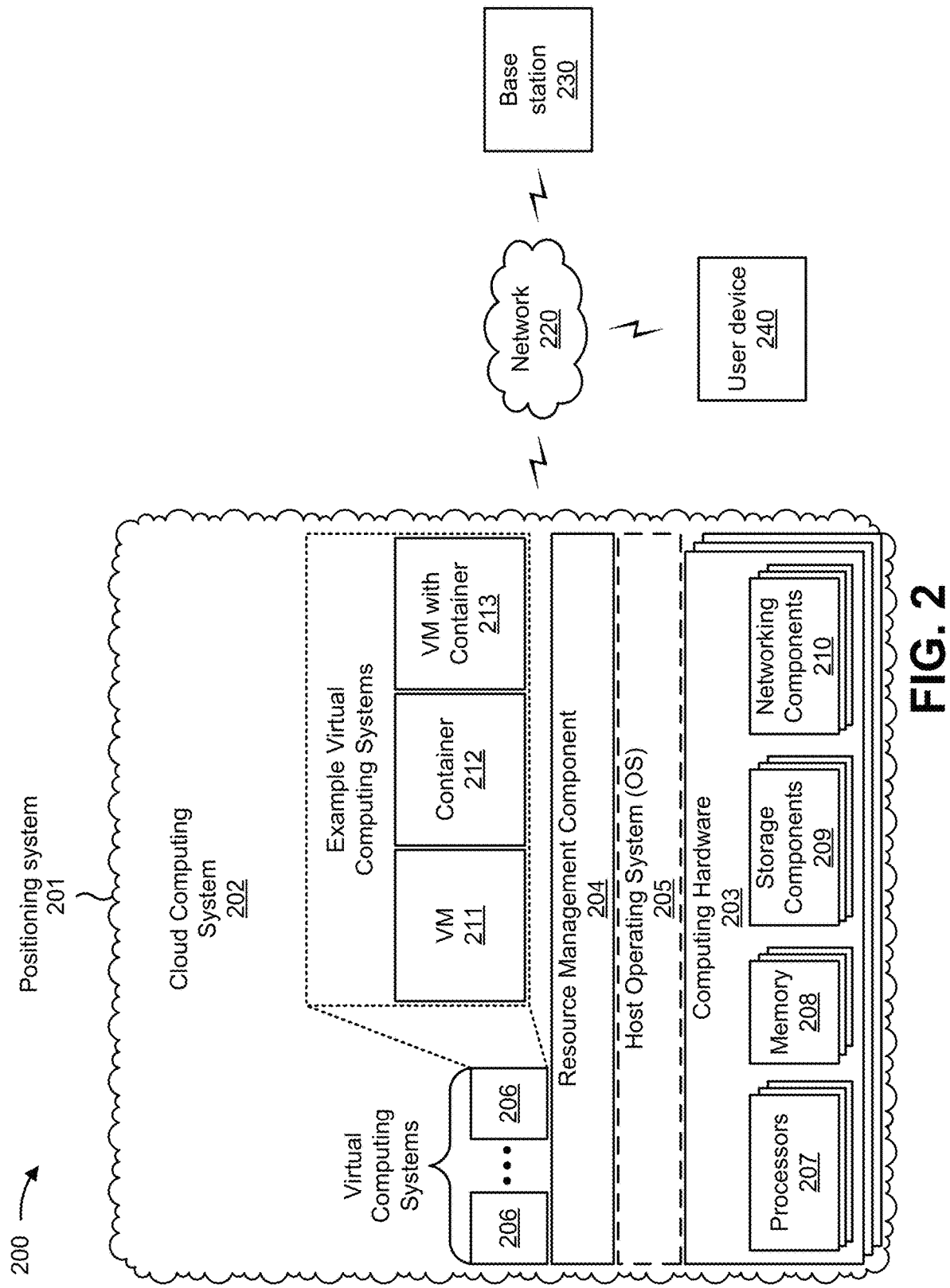

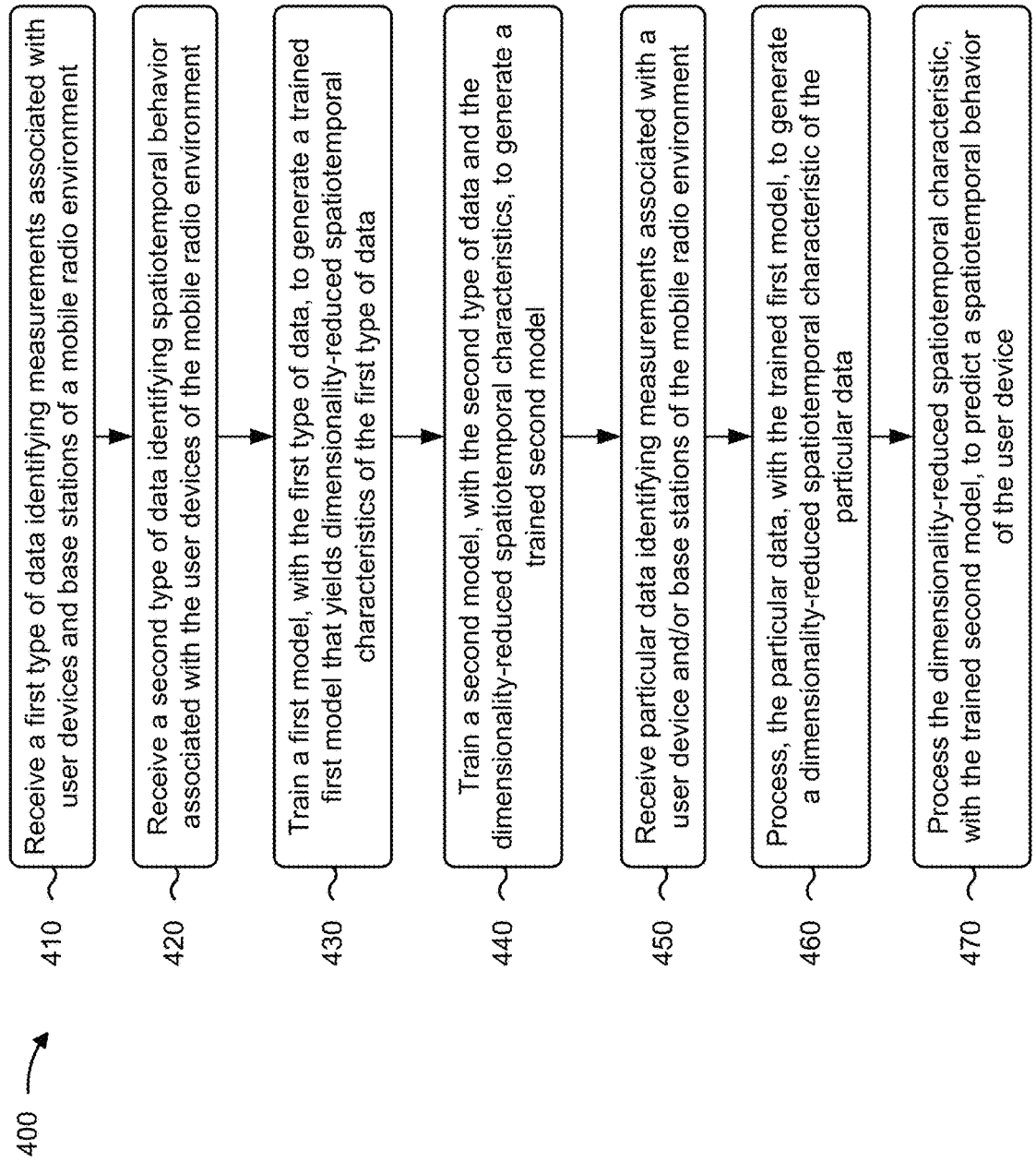

UTILIZING MACHINE LEARNING MODELS TO ESTIMATE USER DEVICE SPATIOTEMPORAL BEHAVIOR

BACKGROUND

There are several applications that depend on estimates of where devices in a wireless communication network (e.g., a cellular network, such as a fifth-generation (5G) network) are currently located, were previously located, or will be located in the future.

SUMMARY

Some implementations described herein relate to a method. The method may include receiving a first type of data identifying measurements associated with user devices and/or base stations of a mobile radio environment, and receiving a second type of data identifying spatiotemporal behavior associated with the user devices of the mobile radio environment. The method may include training a first model, with the first type of data, to generate a trained first model that yields dimensionality-reduced spatiotemporal characteristics of the first type of data, and training a second model, with the second type of data and the dimensionality-reduced spatiotemporal characteristics, to generate a trained second model. The method may include receiving particular data identifying measurements associated with a user device and/or base stations of the mobile radio environment, and processing the particular data, with the trained first model, to generate a dimensionality-reduced spatiotemporal characteristic of the particular data. The method may include processing the dimensionality-reduced spatiotemporal characteristic, with the trained second model, to predict a spatiotemporal behavior of the user device.

Some implementations described herein relate to a device. The device may include one or more memories and one or more processors coupled to the one or more memories. The one or more processors may be configured to receive a first type of data identifying measurements associated with user devices and/or base stations of a mobile radio environment, and receive a second type of data identifying spatiotemporal behavior associated with the user devices of the mobile radio environment. The one or more processors may be configured to train a first model, with the first type of data, to generate a trained first model that yields dimensionality-reduced spatiotemporal characteristics of the first type of data, and train a second model, with the second type of data and the dimensionality-reduced spatiotemporal characteristics, to generate a trained second model. The one or more processors may be configured to receive particular data identifying measurements associated with a user device and/or base stations of the mobile radio environment, and process the particular data, with the trained first model, to generate a dimensionality-reduced spatiotemporal characteristic of the particular data. The one or more processors may be configured to process the dimensionality-reduced spatiotemporal characteristic, with the trained second model, to predict a spatiotemporal behavior of the user device.

Some implementations described herein relate to a non-transitory computer-readable medium that stores a set of instructions for a device. The set of instructions, when executed by one or more processors of the device, may cause the device to receive a first type of data identifying measurements associated with user devices and/or base stations of a mobile radio environment, and receive a second type of data identifying spatiotemporal behavior associated with the user devices of the mobile radio environment. The set of instructions, when executed by one or more processors of the device, may cause the device to train a first model, with the first type of data, to generate a trained first model that yields dimensionality-reduced spatiotemporal characteristics of the first type of data, and train a second model, with the second type of data and the dimensionality-reduced spatiotemporal characteristics, to generate a trained second model. The set of instructions, when executed by one or more processors of the device, may cause the device to receive particular data identifying measurements associated with a user device and/or base stations of the mobile radio environment, and process the particular data, with the trained first model, to generate a dimensionality-reduced spatiotemporal characteristic of the particular data. The set of instructions, when executed by one or more processors of the device, may cause the device to process the dimensionality-reduced spatiotemporal characteristic, with the trained second model, to predict a spatiotemporal behavior of the user device.

BRIEF DESCRIPTION OF THE DRAWINGS

FIGS. 1A-1I are diagrams of an example implementation described herein.

FIG. 2 is a diagram of an example environment in which systems and/or methods described herein may be implemented.

FIG. 4 is a flowchart of an example process for utilizing machine learning models to estimate user device spatiotemporal behavior.

DETAILED DESCRIPTION

Figure 1A:
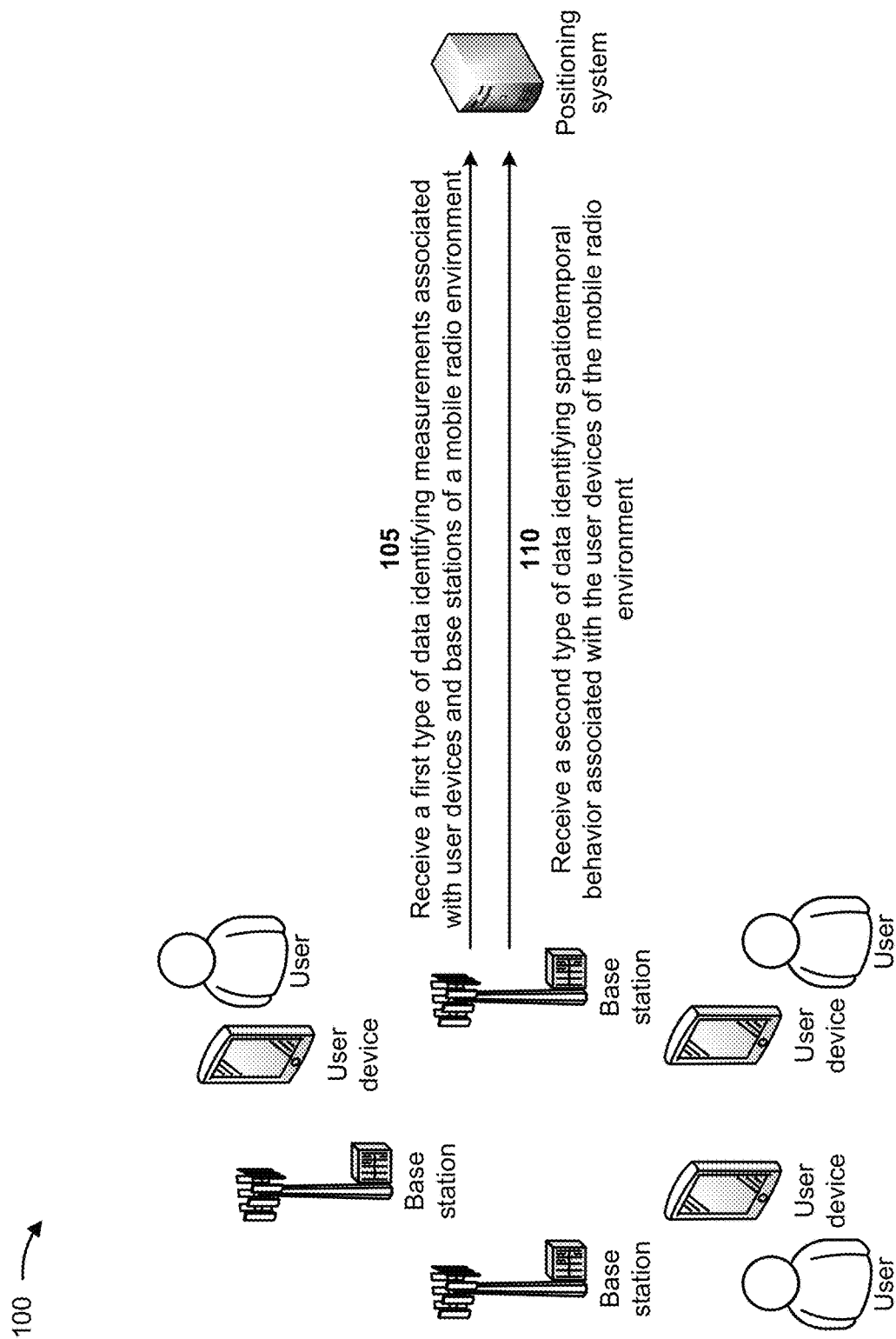

The following detailed description of example implementations refers to the accompanying drawings. The same reference numbers in different drawings may identify the same or similar elements.

There are several applications that may derive a benefit from determining a spatiotemporal behavior of user devices in a wireless communication network, including location, trajectory, velocity, acceleration, orientation, height, bearing and/or the like. The benefit may result from determining the spatiotemporal behavior in the past, present or the future. Some examples of the applications are handover parameter optimization, optimization of handover decisions, base station optimization, resource provisioning, offering products or services to users of user devices, offering discounts to users of user devices, and/or the like. Some models may predict one or more future spatiotemporal behaviors of a user device using, for example, historical spatiotemporal behavior to learn likelihoods of different possible future spatiotemporal behaviors of the user device given recent spatiotemporal behaviors of the user device prior to the prediction. However, accuracies of such models may heavily depend on accuracies and latencies of spatiotemporal behavior of the user device prior to the prediction of future spatiotemporal behavior.

A user device may include one or more global navigation satellite system (GNSS) devices. However, GNSS devices perform poorly, or completely fail, in particular environments, such as urban canyons, deep indoors, and/or the like. Where GNSS devices are operational, location corrections performed by the user device are often not available to entities that need the location corrections to perform a function (e.g., an application optimization), due to lack of protocols to transmit the location corrections from the user device to the entity, privacy concerns, compliance with privacy regulations, and/or the like. A user device may include various sensors that may collect sensor data related to spatiotemporal behavior, such as barometric pressure, magnetic flux, acceleration, temperature, orientation, chemical composition, radiological quantities, and/or the like. However, such sensor data generally does not provide spatiotemporal behavior data that is specific, accurate, and/or the like. Where sensors are present and operational on a user device, sensor data collected by the user device is often not available to entities that need the sensor data to perform a function (e.g., an application optimization), due to lack of protocols to transmit the sensor data from the user device to the entity, privacy concerns, compliance with privacy regulations, and/or the like. A user device may be monitored with a remote sensing system such as a range finder, radar, LIDAR, and/or the like. However, these systems are expensive to procure and operate, must be installed in all geographies in which positioning is needed, and may be perceived as invasive by users of a mobile network. Current signal fingerprinting methods focus on mapping single value signal features, in terms of a received signal strength indicator (RSSI), a reference signal received power (RSRP), reference signal received quality (RSRQ), and/or the like, to positions. However, performances of current signal fingerprinting methods are impacted by measurement noise, channel conditions, measurement error, and/or sporadic availability of measurements.

There are methods that use triangulation and multilateration methods with signal characteristics, such as time difference of arrival (TDoA), angle of departure (AoD), round trip time (RTT), and/or the like. However, such methods are faced with uncertainties in environments characterized by multipath, non-line-of-sight paths, clock synchronization uncertainties, and/or the like. For example, complex clutter environments may introduce fading, shadowing, and/or the like, which may cause signal and timing measurements to be noisy and unreliable. Moreover, a changing environment may cause dynamic errors. These factors make inferring a location of a user device more difficult for geolocation models. In some cases, there may be multiple candidate spatiotemporal behavior quantities that are difficult to disambiguate by utilizing the noisy measurements. One technique to address these factors, where the spatiotemporal behavior quantity is location, includes determining a location of a user device over longer periods of time so that errors in individual measurements can be absorbed and resulting candidate trajectories can be considered. While effective at mitigating errors, the technique delays availabilities of location estimates and is unsuitable for low-latency applications or applications depending on predicting future locations. The technique requires significant computing resources to calculate more accurate location estimates in the presence of measurement errors and is unsuitable for applications that require location estimates with low latency or predictions of future locations.

Therefore, current techniques for predicting a spatiotemporal behavior of a user device consume computing resources (e.g., processing resources, memory resources, communication resources, and/or the like), networking resources, and/or the like associated with utilizing a computationally intensive technique, incorrectly identifying a spatiotemporal behavior, such as location, of a user device, incorrectly performing actions based on the incorrectly identified spatiotemporal behavior of the user device, discovering and correcting the incorrect actions, and/or the like.

Some implementations described herein relate to a positioning system that utilizes machine learning models to estimate user device spatiotemporal behavior. For example, the positioning system may receive a first type of data identifying measurements associated with user devices and/or base stations of a mobile radio environment, and may receive a second type of data identifying spatiotemporal behavior, such as locations and trajectories, associated with the user devices of the mobile radio environment. The positioning system may train a first model, with the first type of data, to generate a trained first model that yields dimensionality-reduced spatiotemporal characteristics of the first type of data, and may train a second model, with the second type of data and the dimensionality-reduced spatiotemporal characteristics, to generate a trained second model. The positioning system may receive particular data identifying measurements associated with a user device and/or base stations of the mobile radio environment, and may process the particular data, with the trained first model, to generate a dimensionality-reduced spatiotemporal characteristic of the particular data. The positioning system may process the dimensionality-reduced spatiotemporal characteristic, with the trained second model, to predict a spatiotemporal behavior of the user device.

In this way, the positioning system utilizes machine learning models to estimate user device spatiotemporal behavior. The positioning system may generate machine learning models that estimate spatiotemporal behavior of user devices based on learned signatures of signal characteristics. The positioning system may estimate the spatiotemporal behavior of the user devices in non-ideal channel conditions and network deployment, and without timing synchronization. The positioning system may utilize radio frequency measurements in adverse environments with high multipath and noise and complex topologies, may learn behaviors of radio frequency signal variations in space and time, and may map the radio frequency variations to spatiotemporal behavior of a user device. The positioning system does not utilize expensive real-time computation and verification of synchronization and signal integrity, but still provides an estimate of a location (e.g., a position) of a user device in real-time, with low latency, in the future, and/or the like. This, in turn, conserves computing resources, networking resources, and/or the like that would otherwise have been consumed in utilizing a computationally intensive technique, incorrectly identifying a location of a user device, incorrectly performing actions based on the incorrectly identified location of the user device, discovering and correcting the incorrect actions, and/or the like.

FIGS. 1A-1I are diagrams of an example 100 associated with utilizing machine learning models to estimate user device spatiotemporal behavior. As shown in FIGS. 1A-1I, example 100 includes a mobile radio environment associated with a positioning system. The mobile radio environment may include multiple base stations communicating with multiple user devices. Further details of the base stations, the user devices, and the positioning system are provided elsewhere herein.

As shown in FIG. 1A, and by reference number 105, the positioning system may receive a first type of data identifying measurements associated with user devices and/or base stations of a mobile radio environment. For example, the positioning system may periodically receive the first type of data from the user devices and/or the base stations over a time period, may continuously receive the first type of data from the user devices and/or the base stations over a time period, and/or the like. The first type of data may include time series characteristics of signals, contextual data representations (e.g., mapping data, key performance indicators (KPIs), and/or the like), data generated by other deployed models in an orchestrated deployment, and/or the like.

Each of the base stations may communicate with one or more user devices via signaling. Since each of the base stations is a transceiver, the signaling may include wireless (e.g., radio frequency (RF)) signals transmitted by the base station to the one or more user devices, wireless (e.g., RF) signals received by the base station from the one or more user devices, wireless signals received by one or more user devices from one or more base stations, wireless signals received by one or more user devices from one or more user devices, and/or the like. The signaling may enable each of the base stations to communicate with the one or more user devices and provide services (e.g., telecommunications services, connections to other networks, and/or the like) to the one or more user devices. The signaling may enable a first user device to communicate with one or more second user devices and provide services to the one or more second user devices. A received strength of a signal between a base station and a user device may depend on a proximity of the base station and the user device, signal power output of the base station, signal power output of the user device, a quantity of obstructions provided between the base station and the user device, types of obstructions provided between the base station and the user device, the degree of non-line-of-sight propagation between the base station and the user device, the degree of constructive and/or destructive interference between different propagation paths at the receiver, and/or the like. A user device may communicate with one or more base stations simultaneously and the base stations may be at different locations, may be operating on different frequency bands, may be operating with different radio access technologies (e.g., 2G, 3G, 4G, 5G, 6G, Wi-Fi, etc.), and/or the like.

In some implementations, the first type of data may include location predictive measurements associated with the user devices. The location predictive measurements may include signal strengths, signal qualities, reference signal received powers (RSRPs), reference signal received qualities (RSRQs), channel quality indicators (CQIs), channel ranks, timing measurements, time difference of arrivals (TDoAs), time difference of departures (TDoDs), time of arrivals (ToAs), range measurements, remote sensing measurements, and/or the like associated with the user devices. In some implementations, the location predictive measurements may measure the reference signal, demodulation reference signals (DMRS), phase tracking reference signals (PTRS), sounding reference signals (SRS), channel state reference signals (CSI-RS), positioning reference signals (PRS), sidelink reference signal, transmission frame reception, transmission subframe reception, and/or the like. The location predictive measurements may also include contextual data, such as graphic information system (GIS) data, mapping data, obstruction data, event data identifying user device events (e.g., calendar data, sporting events, and/or the like), land use data, demographic data, census data, survey data, clutter data, and/or the like. The location predictive measurements may also include various sensor data, available at the user device and related to spatiotemporal behavior, such as barometric pressure, magnetic flux, acceleration, temperature, orientation, chemical composition, radiological quantities, and/or the like. The location predictive measurements may be generated by a remote sensing system such as a range finder, radar, LIDAR, and/or the like.

In some implementations, the first type of data may include measurements or KPIs associated with the signaling provided between the base stations and the user devices of the mobile radio environment in the geographical area (e.g., over a time period). The measurements may include events (e.g., connections, traffic transmission, traffic reception, and/or the like) recorded by performance counters associated with the base stations and/or the user devices. The KPIs may be calculated based on the measurements (e.g., the recorded events). The KPIs may include bandwidths, throughputs, signal strengths, availability indicators (e.g., percentages of time that the base stations are providing services to the user devices), network resource indicators (e.g., traffic and control channels provided by the base stations), handover indicators (e.g., a handover of a moving user device from one base station to another base station), voice service indicators, data service indicators, and/or the like. In some implementations, the positioning system may receive the measurements and/or the signaling from the base stations and/or the user devices, and may calculate the KPIs based on the measurements and/or the signaling.

As further shown in FIG. 1A, and by reference number 110, the positioning system may receive a second type of data identifying spatiotemporal behavior, such as locations and trajectories, associated with the user devices of the mobile radio environment. For example, the positioning system may periodically receive the second type of data from the user devices and/or the base stations over a time period, may continuously receive the second type of data from the user devices and/or the base stations over a time period, and/or the like. The second type of data may include data identifying signaling characteristics (e.g., labeled using positioning solutions) associated with the user devices, global positioning system (GPS) signaling associated with the user devices, global navigation satellite system (GNSS) signaling associated with the user devices, contextual information associated with the user devices and/or other systems, and/or the like. The second type of data may be generated via drive-tests, minimization of drive tests, sensor data, remote sensing data, and/or the like. The second type of data may be stored in database systems and/or other systems, and the positioning system may receive the second type of data via data streams from the database systems and/or the other systems.

Figure 1B:
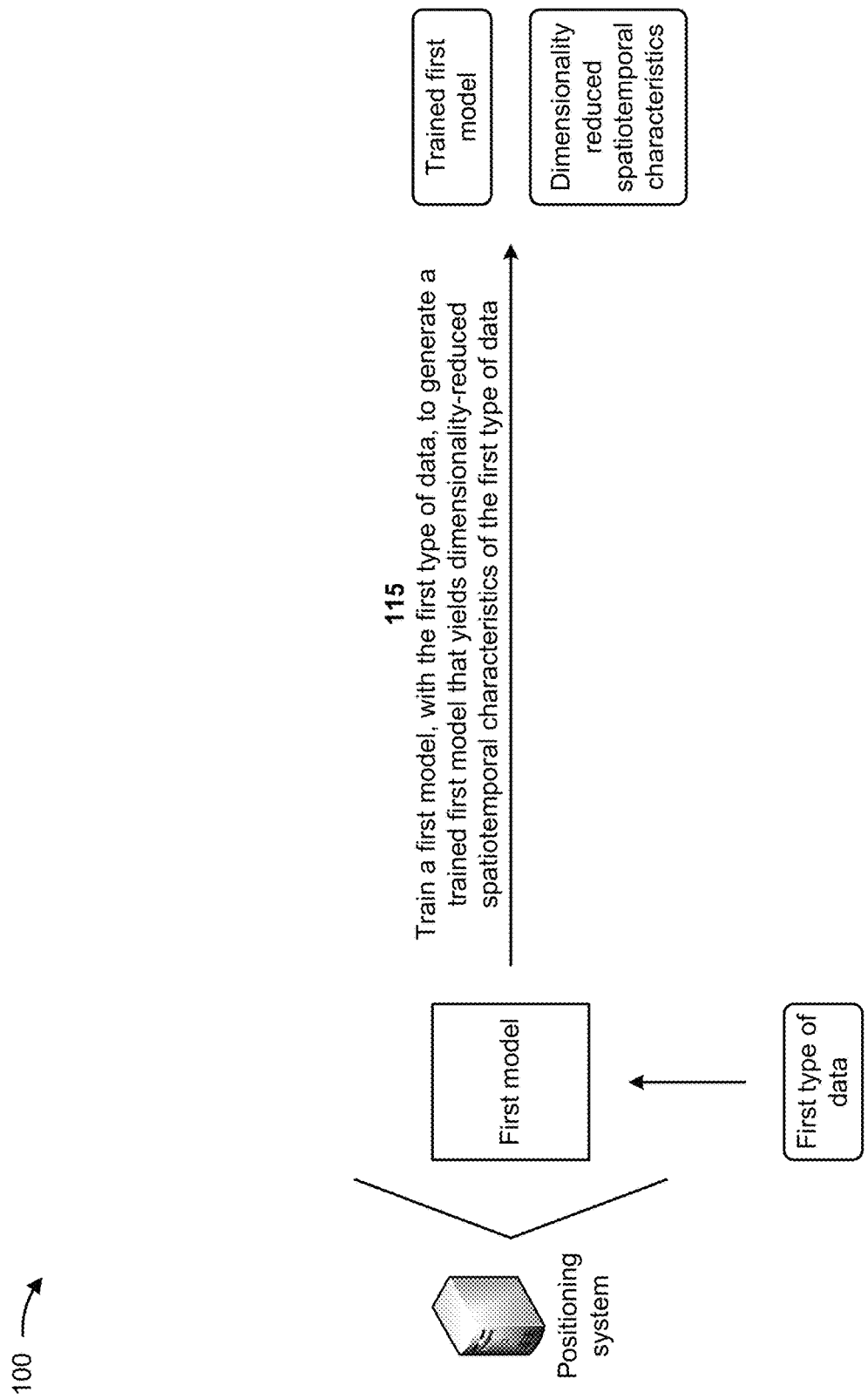

As shown in FIG. 1B, and by reference number 115, the positioning system may train a first model, with the first type of data, to generate a trained first model that yields dimensionality-reduced spatiotemporal characteristics of the first type of data. For example, the first model may include a machine learning model, such as a neural network model, an auto-encoder model, a variational autoencoder model, a principal component analysis model, a singular value decomposition model, an eigenvector decomposition model, and/or the like. Examples of auto-encoder models are provided below in connection with FIGS. 1D and 1E. In some implementations, the dimensionality-reduced spatiotemporal characteristics may facilitate storage and sharing of data between network processing elements to, for example, enable data processed at a distributed node to be subsequently processed at other more centralized nodes or between distributed peer nodes. In some implementations, the dimensionality-reduced spatiotemporal characteristics may be utilized to train a dimensionality reduction model for another mobile radio environment (e.g., to supplement a data set with patterns that might otherwise not be processed by the dimensionality reduction model and may produce erroneous results).

In some implementations, the distributed peer nodes may exchange learned features between them and/or the centralized node. These learned features may include invariant aspects of data to which the distributed nodes are exposed. The learned features may include dimensionality reduced representations, model parameters, and/or the like. The centralized node may combine the learned features with the existing learned features of the centralized node to improve an inference accuracy and/or a training performance of the centralized node.

In some implementations, the positioning system may divide the first type of data into a first portion of data, a second portion of data, and a third portion of data. The first portion, the second portion, and the third portion may include a same quantity of the first type of data, different quantities of the first type of data, and/or the like. In some implementations, more of the first type of data may be allotted to the first portion since the first portion may be utilized to generate the training data set for the first model.

The positioning system may generate a training dataset for the first model based on the first portion of data. The positioning system may generate a validation dataset for the first model based on the second portion of data. The positioning system may generate a test dataset for the first model based on the third portion of data. In other implementations, the positioning system may utilize different portions to generate the training dataset, the validation dataset, and/or the test dataset for the first model.

The positioning system may train the first model with the training dataset to generate the trained first model. As described elsewhere herein, the first model may be trained to process real time data associated with base stations and user devices, and identify dimensionality-reduced spatiotemporal characteristics of the real time data. In some implementations, rather than training the first model, the positioning system may obtain the trained first model from another system or device that trained the first model. In this case, the positioning system may provide the other system or device with the training dataset, the validation dataset, and/or the test dataset for use in training the first model, and may provide the other system or device with updated training, validation, and/or test datasets to retrain the first model in order to update the first model.

In some implementations, the positioning system may train the first model with the training dataset to generate the trained first model, and may process the validation dataset, with the trained first model, to validate that the trained first model is operating correctly. If the trained first model is operating correctly, the positioning system may process the trained first model, with the test dataset, to further ensure that the trained first model is operating correctly. A trained model can be said to be operating correctly if it has adequate accuracy, has adequate precision, has adequate recall, is not subject to excessive overfitting, and/or the like. If the trained first model is operating excessively incorrectly, the positioning system may modify the trained first model and may revalidate and/or retest the modified first model based on the validation dataset and/or the test dataset. The positioning system may modify or replace the trained first model based on a trigger mechanism (e.g., a predefined validity time, a system upgrade, a software upgrade, and/or the like) and may revalidate and/or retest the modified or replacement first model.

The positioning system may train the first model to identify spatiotemporal behavior of the first type of data. The first model may encode multiple samples of signal attributes and any set of available contextual information. Instead of directly mapping the first type of data, the first model may produce a dimensionality-reduced intermediate representation that filters out elements of the first type of data that are not informative to a position estimation prediction and that reduces the effect of noise. A low dimensional representation may include a tensor with elements that are linear and/or non-linear combinations of the first type of data, but with a size that is considerably smaller than a size of the first type of data. In some implementations, the first model may include a neural-network-based dimensionality reduction model. The neural network model may be efficient in learning from massive amounts of data, and may incrementally learn, after deployment, through batch-based retraining, online learning, and/or the like.

Figure 1C:
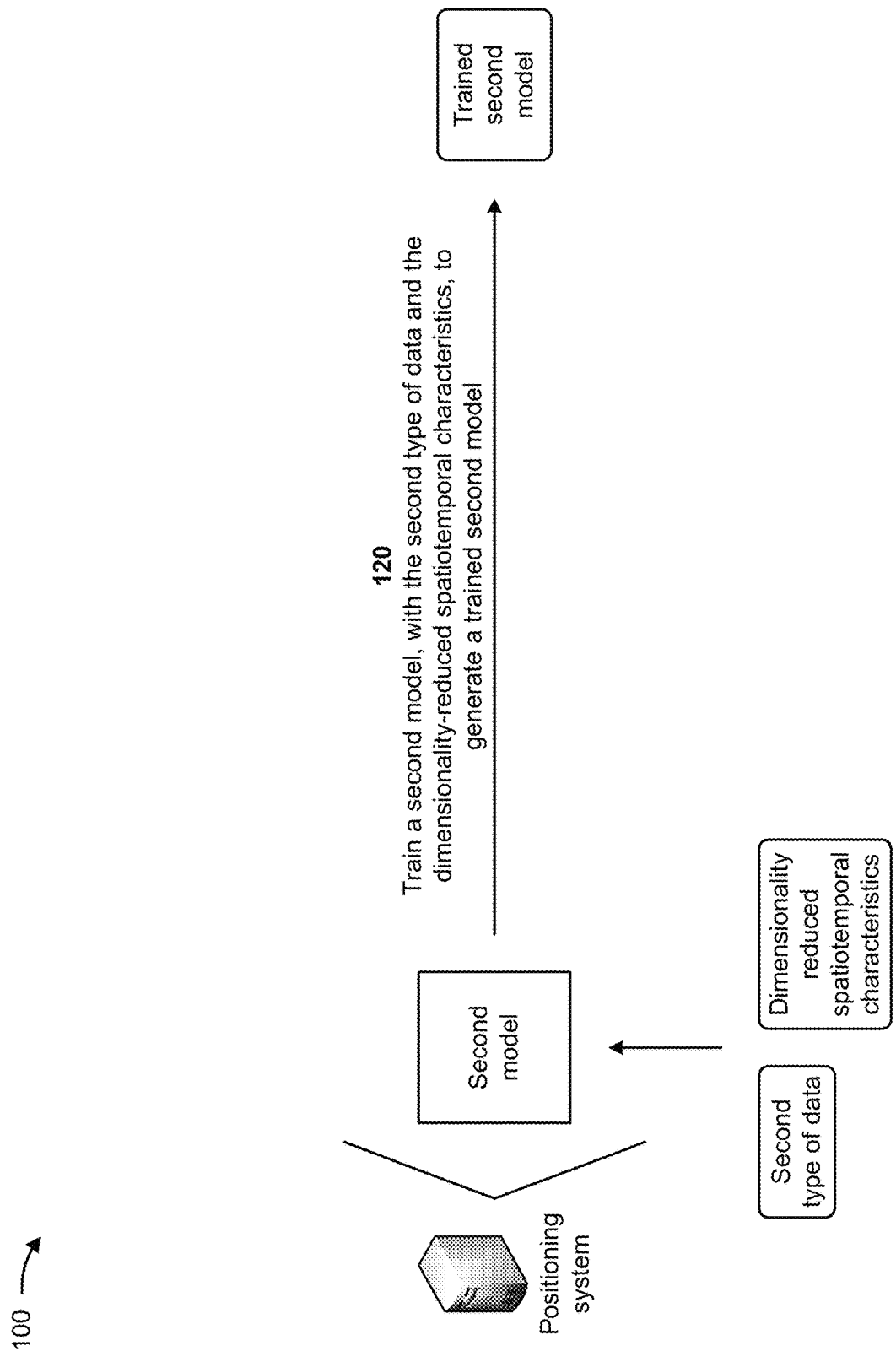

As shown in FIG. 1C, and by reference number 120, the positioning system may train a second model, with the second type of data and the dimensionality-reduced spatiotemporal characteristics, to generate a trained second model. For example, the second model may include a machine learning model. The positioning system may divide the second type of data and the dimensionality-reduced spatiotemporal characteristics into a first portion of data, a second portion of data, and a third portion of data. The first portion, the second portion, and the third portion may include a same quantity of the first type of data and the dimensionality-reduced spatiotemporal characteristics, different quantities of the first type of data and the dimensionality-reduced spatiotemporal characteristics, and/or the like. In some implementations, more of the first type of data and the dimensionality-reduced spatiotemporal characteristics may be allotted to the first portion since the first portion may be utilized to generate the training data set for the second model.

The positioning system may generate a training dataset for the second model based on the first portion of data. The positioning system may generate a validation dataset for the second model based on the second portion of data. The positioning system may generate a test dataset for the second model based on the third portion of data. In other implementations, the positioning system may utilize different portions to generate the training dataset, the validation dataset, and/or the test dataset for the second model.

The positioning system may train the second model with the training dataset to generate the trained second model. As described elsewhere herein, the second model may be trained to process real time dimensionality-reduced spatiotemporal characteristics, and identify spatiotemporal behavior (e.g., geolocations, trajectories, bounding shapes, heights, and/or the like) of the real time characteristics. In some implementations, rather than training the second model, the positioning system may obtain the trained second model from another system or device that trained the second model. In this case, the positioning system may provide the other system or device with the training dataset, the validation dataset, and/or the test dataset for use in training the second model, and may provide the other system or device with updated training, validation, and/or test datasets to retrain the second model in order to update the second model.

In some implementations, the positioning system may train the second model with the training dataset to generate the trained second model, and may process the validation dataset, with the trained second model, to validate that the trained second model is operating correctly. If the trained second model is operating correctly, the positioning system may process the trained second model, with the test dataset, to further ensure that the trained second model is operating correctly. A trained model can be said to be operating correctly if it has adequate accuracy, has adequate precision, has adequate recall, is not subject to excessive overfitting, and/or the like. If the trained second model is operating excessively incorrectly, the positioning system may modify the trained second model and may revalidate and/or retest the modified second model based on the validation dataset and/or the test dataset. The positioning system may modify or replace the trained second model based on trigger mechanism (e.g., a predefined validity time, a system upgrade, a software upgrade, and/or the like) and may revalidate and/or retest the modified or replacement second model.

The first model may be trained to denoise location predictive measurements used for estimating geolocation and thus to facilitate the inference of the spatiotemporal characteristics from the dimensionality-reduced spatiotemporal characteristic outputs of the denoising model. The second model may be trained to utilize the dimensionality-reduced spatiotemporal characteristic outputs to estimate a geolocation of the user device, a spatiotemporal behavior of the user device, a prior spatiotemporal behavior (geolocation, trajectory, velocity, acceleration, orientation, height, bearing, and/or the like) of the user device, a future spatiotemporal behavior that the user device is likely to exhibit, and/or the like. The second model may estimate possible spatiotemporal behaviors and probabilities associated with each possible spatiotemporal behavior, for spatiotemporal behaviors in the past, present and/or future. The second model may be trained in a variety of ways. For example, when some GNSS measurements of geolocations are available, such measurements may be paired with outputs of the first model and used as training examples for the second model. Moreover, by way of another example, when a geolocation estimator is available that mitigates errors and/or ambiguities in location predictive measurements over longer time periods, but the geolocation estimator is unsuitable for low latency applications or deployment in scenarios with limited computing resources, geolocation estimates output by the geolocation estimator may be paired with the outputs of the first model and used as training examples for the second model. These techniques for obtaining training data may be combined with each other, combined with other techniques, replaced with other techniques, and/or the like.

The first model may generate low dimensional tensor representations of temporal variations of measured location predictive measurements. Instead of processing single value dimensionality-reduced spatiotemporal characteristics in isolation, the second model may analyze a sequential series of dimensionality-reduced spatiotemporal characteristics around a target time to capture temporal variations. Such sequential dimensionality-reduced spatiotemporal characteristics generally contain more information characterizing geographical coordinates of interest than a single dimensionality-reduced spatiotemporal characteristic. The learned representations, being lower in dimension, may be generated through learned non-linear parameterized functions, in a process that transforms input measurements, to an intermediate representation (e.g., a low dimensional tensor) that retains combinations of input features that are most relevant to describe temporal behavior of signal characteristics. In some implementations, a linear combination of the location predictive measurements and/or a mix of linear and non-linear combinations of the location predictive measurements may be utilized.

The learned tensor representations may include signatures of behavior of location predictive measurements and may be sufficiently descriptive of unique snapshots of location predictive measurements. The signatures may be resilient to noise in location predictive measurements associated with shadowing, shadow fading, blockage, non-line-of-sight, multipath, channel condition dynamics, measurement error, sporadic availability of measurements, and/or the like. This resilience may be due to the signatures being learned based on a large quantity of training samples. The signatures may withstand missing location predictive measurements at deployment time, since the first model may utilize a process that generates the low dimensional representation, even when some input data points or features are missing, using imputation, interpolation, extrapolation, and/or the like. The first model may map stochastic behavior of a propagation channel on a transmitted signal, from initial training samples.

Figure 1D:
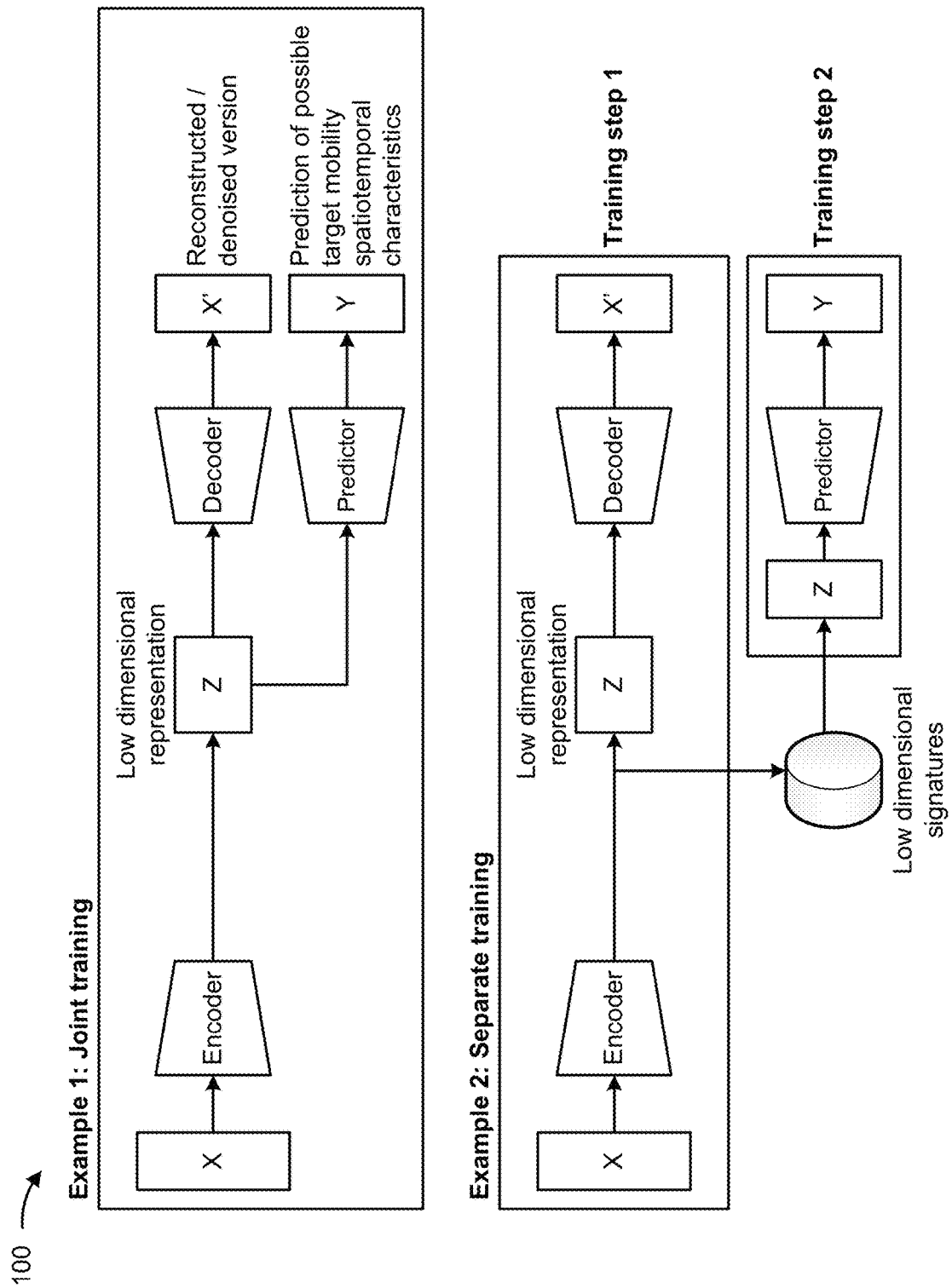
Figure 1E:
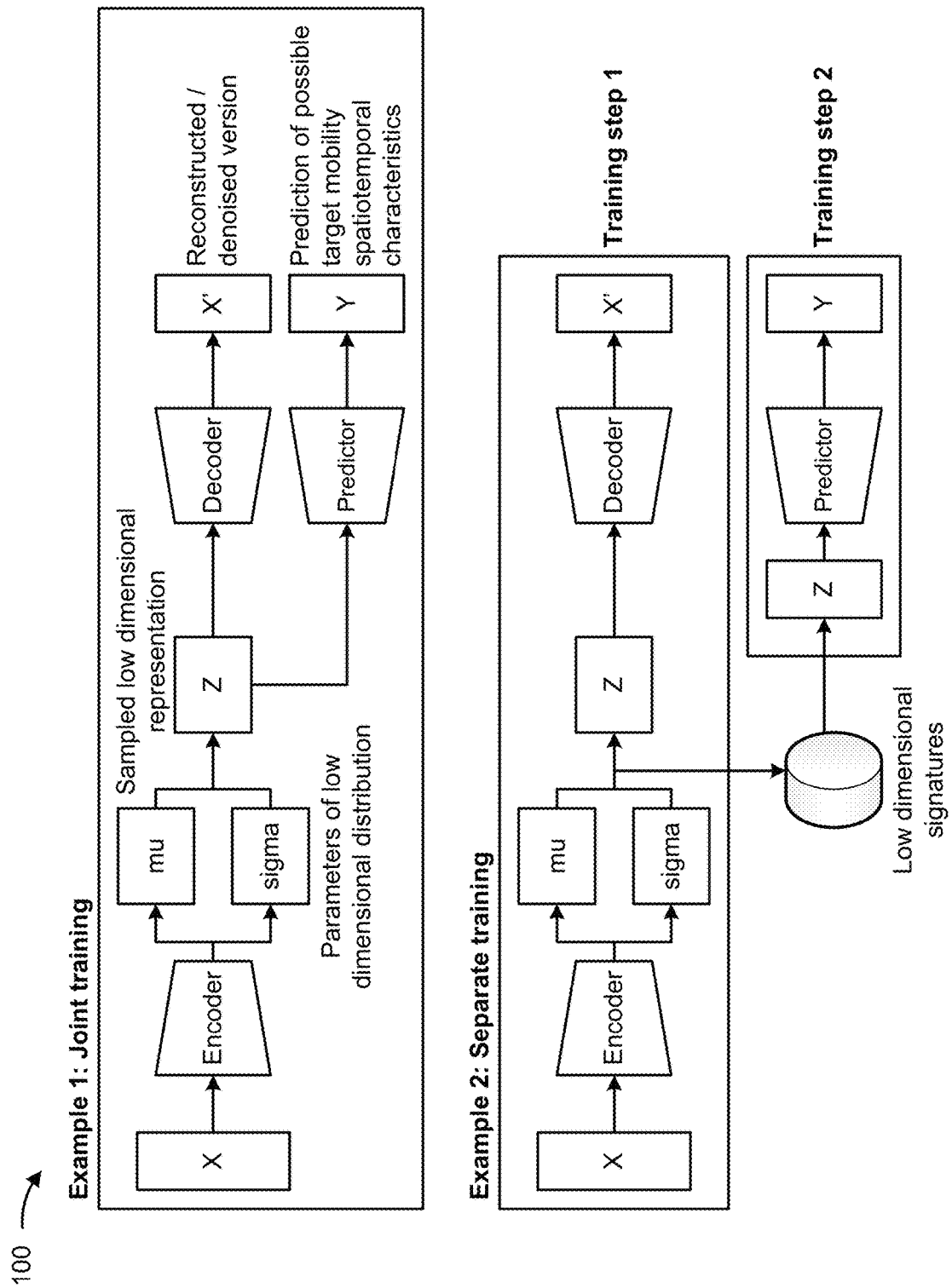

FIGS. 1D and 1E depict examples of the first model and the second model, and examples of how to train the first model and the second model. In each example, the positioning system may jointly train the first model and the second model or may separately train the first model and the second model. As shown in FIG. 1D, during joint training of the first model and the second model, the first model may include an encoder-decoder arrangement and the second model may include a predictor arrangement. The first model and the second model may form an encoder-decoder model based on neural network units. The encoder may project an input (X) to a low dimensional representation (Z), and a decoder may utilize the low dimensional representation to reconstruct the initial input (X) (e.g., from a limited size of low dimensional features). An error between the reconstructed input (X) and the initial input (X) may be referred to as a reconstruction error. Through exposure to the training data, reliance on the reconstruction error as a loss function, minimization of the loss function as an objective function, and gradient-descent (or any of its variants) as a backpropagation mechanism to update parameters, the first model may converge to a combination of parameters that generate an informative latent representation (e.g., spatiotemporal characteristics of location predictive measurements at a lower dimensionality), and may reconstruct an alternative version of input location predictive measurements that is denoised.

A latent portion of the encoder-decoder (e.g., the second model) may include a separate branch that implements a predictor. The predictor may project a latent representation to a target spatiotemporal characteristic (Y) of interest (e.g., geolocation coordinates or a trajectory of geolocation coordinates). As further shown in FIG. 1D (e.g., in the separate training portion), the predictor may be trained separately from features generated by the encoder using the reconstruction error. As shown in the joint training portion of FIG. 1D, the predictor may be jointly trained with the decoder by causing the low dimensional output of the encoder to be forwarded to both the decoder and predictor. In such an arrangement both the reconstruction error and the geolocation estimation error may be computed, and summed. Gradients of the reconstruction error and the geolocation estimation error may be backpropagated to update model parameters (e.g., parameters for the encoder, the decoder, and the predictor).

FIG. 1E depicts a similar arrangement to FIG. 1D, but the encoder of FIG. 1E (e.g., a variational autoencoder) may generate the latent features stochastically by learning an underlying distribution (e.g., mu and sigma) of the spatiotemporal behavior in a latent space. In such an example, instead of decoding a single learned sample (e.g., a fingerprint) at a lower dimensionality, the decoder and the predictor may sample from the learned distribution of the latent representation. As a consequence, the predictor may predict possible target mobility spatiotemporal behavior. Through multiple sampling of low dimensional representations from the learned latent distribution, and estimation of an associated prediction through the decoder and/or the predictor, the positioning system may estimate a probability of occurrence of a particular prediction.

Figure 1F:
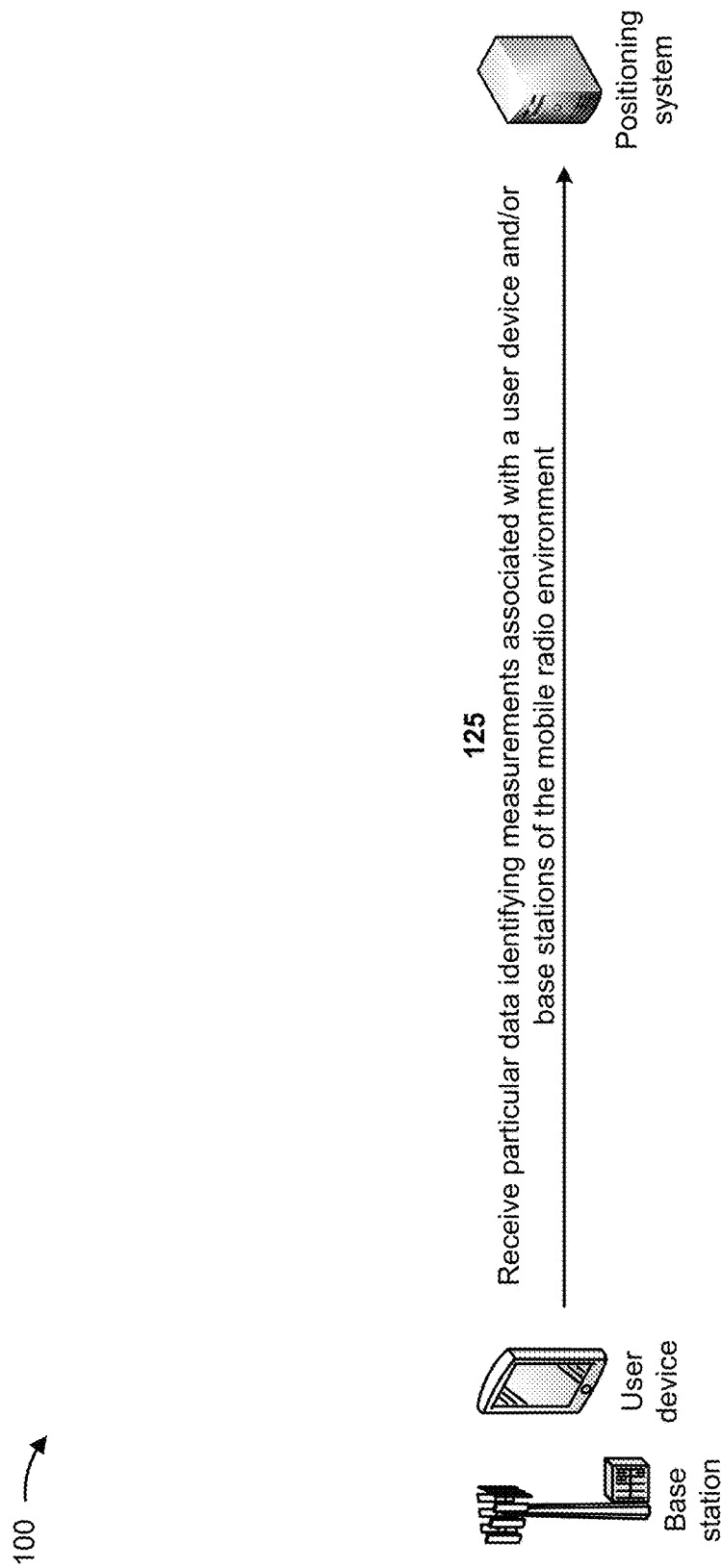

As shown in FIG. 1F, and by reference number 125, the positioning system may receive particular data identifying measurements associated with a user device and/or base stations of the mobile radio environment. For example, the positioning system may periodically receive the particular data from the user device and/or base stations over a time period, may continuously receive the particular data from the user device and/or base stations over a time period, and/or the like. The particular data may include data identifying signaling characteristics (e.g., labeled using positioning solutions) associated with the user device, GPS signaling associated with the user device, GNSS signaling associated with the user device, contextual information associated with the user device and/or other systems, and/or the like. The particular data may be generated via a drive-test, a minimization of drive tests, and/or the like. The particular data may be stored in database systems and/or other systems, and the positioning system may receive the particular data via data streams from the database systems and/or the other systems.

In some implementations, the particular data may include location predictive measurements associated with the user device and/or base stations. The location predictive measurements may include signal strengths, signal qualities, RSRPs, RSRQs, CQIs, channel ranks, timing measurements, TDoAs, TDoDs, ToAs, range measurements, remote sensing measurements, and/or the like associated with the user devices. The location predictive measurements may include a reference signal, demodulation reference signals, phase tracking reference signals, sounding reference signals, channel state reference signals, positioning reference signals, sidelink reference signal, transmission frame reception, transmission subframe reception, and/or the like associated with the user device. The location predictive measurements may also include contextual data, such as GIS data, mapping data, obstruction data, land use data, demographic data, census data, survey data, clutter data, and/or the like.

Figure 1G:
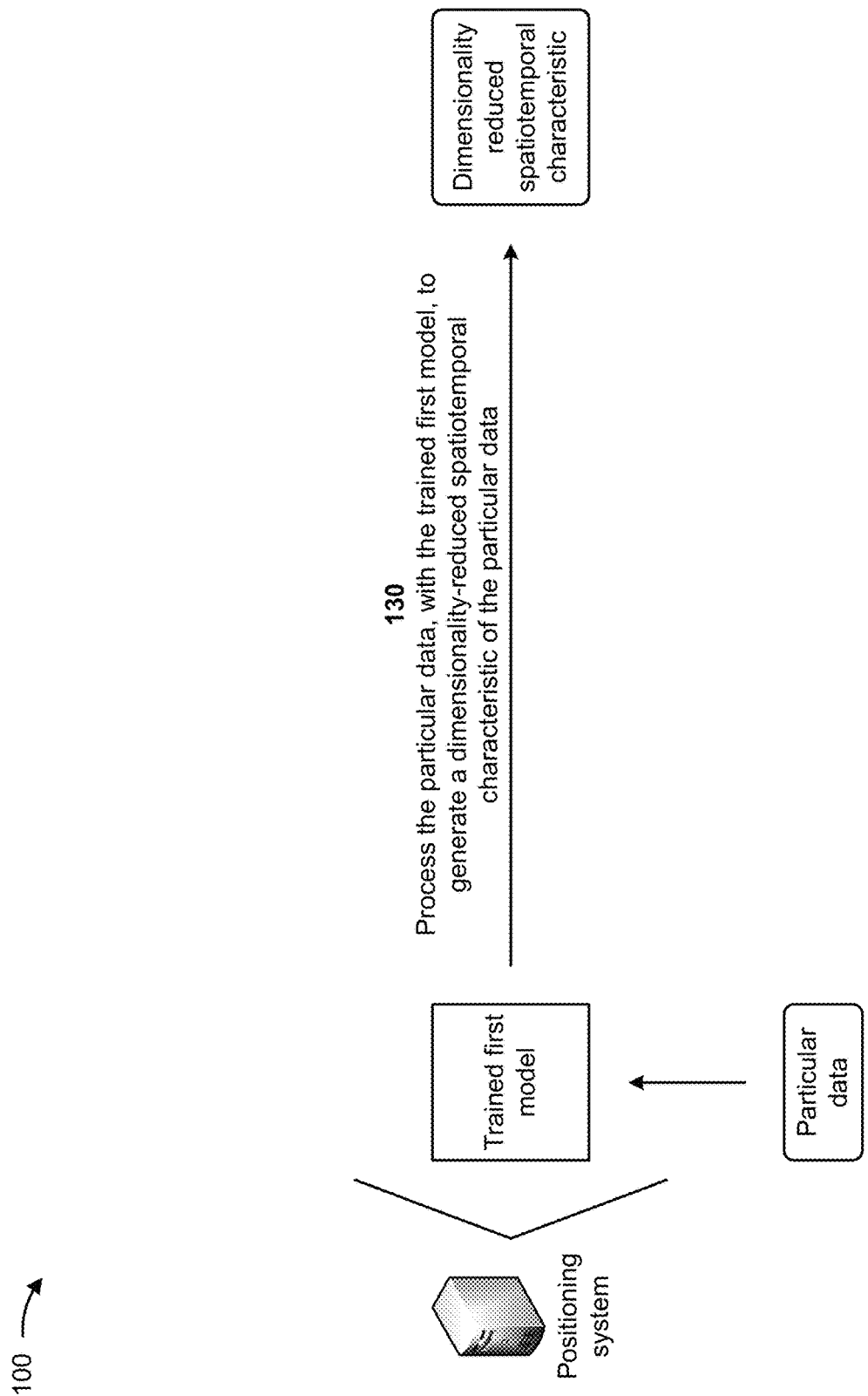

As shown in FIG. 1G, and by reference number 130, the positioning system may process the particular data, with the trained first model, to generate a dimensionality-reduced spatiotemporal characteristic of the particular data. For example, the positioning system may process the particular data, with the trained first model, to identify spatiotemporal behavior of the particular data. The trained first model may encode multiple sequential samples of signal attributes and any set of available contextual information included in the particular data. The trained first model may generate a dimensionality-reduced intermediate representation (e.g., the dimensionality-reduced spatiotemporal characteristic) that filters out elements of the particular data that are not informative to a position estimation prediction and that reduces the effect of noise.

Figure 1H:
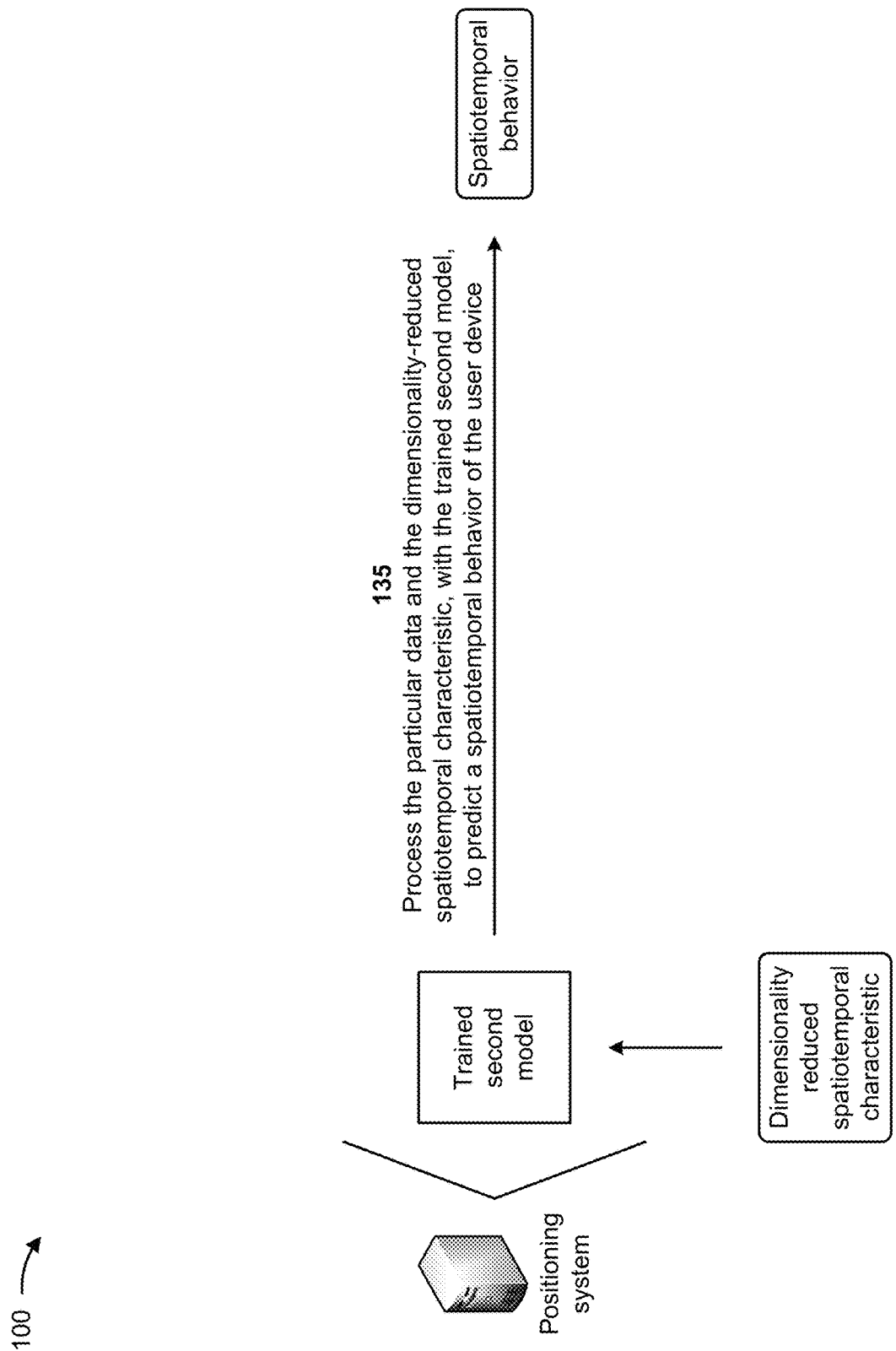

As shown in FIG. 1H, and by reference number 135, the positioning system may process the dimensionality-reduced spatiotemporal characteristic (e.g., and optionally the particular data), with the trained second model, to predict a spatiotemporal behavior of the user device. In some implementations, the positioning system may process the dimensionality-reduced spatiotemporal characteristic, with the trained second model, to predict the spatiotemporal behavior (e.g., a predicted geolocation, trajectory, velocity, acceleration, orientation, height, bearing, and/or the like) of the user device. The positioning system may process the dimensionality-reduced spatiotemporal characteristic, with the trained second model, to estimate possible future spatiotemporal behaviors of the user device and probabilities associated with each possible future spatiotemporal behavior. The second model may select the spatiotemporal behavior (e.g., the geolocation, trajectory, velocity, acceleration, orientation, height, bearing, and/or the like) of the user device based on the probabilities associated with each possible future spatiotemporal behavior, of the user device. For example, the second model may predict that there is a 30% chance the user device will be at location A at a particular time, that there is a 20% chance the user device will be at location B at the particular time, and that there is a 50% chance the user device will be at location C at the particular time. In such an example, the second model may select location C as the spatiotemporal characteristic of the user device since location C is associated with a greatest probability.

As shown in FIG. 1I, and by reference number 140, the positioning system may perform one or more actions based on the spatiotemporal behavior. In some implementations, performing the one or more actions includes the positioning system optimizing handover decisions for the user device based on the spatiotemporal behavior. For example, the positioning system may determine a future location of the user device, and may optimize handover decisions for the user device based on the future location. In this way, the positioning system conserves computing resources, networking resources, and/or the like that would otherwise have been consumed in utilizing a computationally intensive technique, incorrectly identifying a location of a user device, incorrectly performing actions based on the incorrectly identified location of the user device, discovering and correcting the incorrect actions, and/or the like.

In some implementations, performing the one or more actions includes the positioning system causing the trained first model and the trained second model to be implemented. For example, the positioning system may cause a base station to implement the trained first model and the trained second model with real time data. The base station may process the real time data, with the trained first model and the trained second model, to make predictions associated with spatiotemporal behavior of user devices. In this way, the positioning system conserves computing resources, networking resources, and/or the like that would otherwise have been consumed in incorrectly performing actions based on incorrectly identifying a location of a user device, discovering and correcting the incorrect actions, and/or the like.

In some implementations, performing the one or more actions includes the positioning system updating the first model and/or the second model based on evaluation of the spatiotemporal characteristic and/or the spatiotemporal behavior. For example, the positioning system may evaluate a correctness of the spatiotemporal characteristic and/or the spatiotemporal behavior, and may determine that the spatiotemporal characteristic and/or the spatiotemporal behavior is excessively incorrect and may modify or update the first model and/or the second model based on the incorrect spatiotemporal characteristic and/or the spatiotemporal behavior. For example, the positioning system may update the first model and/or the second model using an existing first set of data and/or the second set of data as was previously used to train the first and/or second model, using a new first set of data and/or second set of data not previously used to train the first and/or second model, a mixture of existing and new data, and/or the like. In this way, the positioning system conserves computing resources, networking resources, and/or the like that would otherwise have been consumed in utilizing a computationally intensive technique, incorrectly identifying a location of a user device, and/or the like.

In some implementations, performing the one or more actions includes the positioning system causing the spatiotemporal characteristic to be provided to a network device. For example, the positioning system may provide the data representing spatiotemporal behavior to a base station associated with the user device. The base station may utilize the spatiotemporal behavior to adjust parameters (e.g., angle, tilt, handover parameters, and/or the like) associated with the base station. In this way, the positioning system conserves computing resources, networking resources, and/or the like that would otherwise have been consumed in utilizing a computationally intensive technique, incorrectly performing actions based on incorrectly identifying a location of a user device, discovering and correcting the incorrect actions, and/or the like.

In some implementations, the first model and/or the second model may be provided in user devices, xApps and/or rApps of base stations, application functions, other core/RAN/edge network functions, and/or the like. Such an orchestration may allow the first model and/or the second model to learn to predict spatiotemporal behavior for different views of a geographic area covered by a network. A set of first and second models may connect to a more centralized model that combines learned attributes to learn to predict spatiotemporal behavior for a more complete view of the network. A combination of partial knowledge of the set of models may be performed as a rules-based step, where the centralized model receives requests to determine a spatiotemporal behavior, such as position estimation, of a specific user device, and forwards the requests to a specialized model to handle an actual estimation of the spatiotemporal behavior, such as location, of the specific user device based on criteria such as the respective ages of the models, the reconstruction error of the autoencoder, the geographical region of the network, and/or the like. In the case where multiple models intersect in geographic coverage and could estimate the spatiotemporal behavior, such as location, estimations of each such models may be combined by the centralized model.

The centralized model could also be a separate model trained on the data used by all of the low-level specialized models, although in some implementations trained at a longer periodicity. Since such training may require transmission of data from distributed models to a centralized location, a total bandwidth needed for this data may grow considerably and congest network resources. Hence, such data may generally not be streamed, but rather transported in batches, according to capacity, with network performance in mind.

The positioning system may utilize existing and future signaling mechanisms for 5G, 4G, and future systems, through a machine learning dimensionality-reduction-based model, to extract accurate spatiotemporal behavior estimates, such as location estimates for user devices. The positioning system may enable estimation of spatiotemporal behavior, such as locations, of user devices in adverse channel and propagation environments, and may enable estimation of multiple sequential quantities representing spatiotemporal behavior, such as locations, of user devices. The positioning system may augment existing spatiotemporal behavior estimation solutions, such as location solutions, by providing a mechanism to learn capabilities of such solutions and to redeploy the capabilities in a more lightweight and scalable manner.

The positioning system may enhance an estimation of a spatiotemporal behavior, such as location, of a user device by utilizing a subset of user devices more capable of producing precise measurements and spatiotemporal behavior quantities such as locations, that are traversing a same physical environment and producing high quality measurements and spatiotemporal behavior estimates such as location estimates. These high-quality user devices could, for example, be intentionally deployed as part of a measurement campaign, or could be commanded by a network to conduct dedicated measurement campaigns. Learned signatures from the high-quality user devices may be applicable to all existing user devices or to future user devices that might interact with the same physical environment.

In some implementations, the trained first model and the trained second model may be implemented in a user device, a server device, a cloud-based device, a base station, and/or another network device.

In this way, the positioning system utilizes machine learning models to estimate user device spatiotemporal behavior. The positioning system may generate machine learning models that estimate spatiotemporal behavior of user devices based on learned signatures of signal characteristics. The positioning system may estimate the spatiotemporal behavior of the user devices in non-ideal channel conditions and network deployment, and without timing synchronization. The positioning system may utilize radio frequency measurements in adverse environments with high multipath and noise and complex topologies, may learn behaviors of radio frequency signal variations in space and time, and may map the radio frequency variations to spatiotemporal behavior of a user device. The positioning system does not utilize expensive real-time computation and verification of synchronization and signal integrity, but still provides a real-time estimate of a spatiotemporal behavior (e.g., a location, a trajectory, a velocity, an acceleration, an orientation, a height, a bearing, and/or the like) of a user device. This, in turn, conserves computing resources, networking resources, and/or the like that would otherwise have been consumed in utilizing a computationally intensive technique, incorrectly identifying a spatiotemporal behavior, such as location, of a user device, incorrectly performing actions based on the incorrectly identified spatiotemporal behavior, such as location, of the user device, discovering and correcting the incorrect actions, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices)

shown in FIGS. 1A-1I may perform one or more functions described as being performed by another set of devices shown in FIGS. 1A-1I.

FIG. 2 is a diagram of an example environment 200 in which systems and/or methods described herein may be implemented. As shown in FIG. 2, the environment 200 may include a positioning system 201, which may include one or more elements of and/or may execute within a cloud computing system 202. The cloud computing system 202 may include one or more elements 203-213, as described in more detail below. As further shown in FIG. 2, the environment 200 may include a network 220, a base station 230, and/or a user device 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the positioning system 201 may include one or more elements 203-213 of the cloud computing system 202, may execute within the cloud computing system 202, and/or may be hosted within the cloud computing system 202, in some implementations, the positioning system 201 may not be cloud-based (e.g., may be implemented outside of a cloud computing system) or may be partially cloud-based. For example, the positioning system 201 may include one or more devices that are not part of the cloud computing system 202, such as a device 300 of FIG. 3, which may include a standalone server or another type of computing device. The positioning system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The base station 230 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 240. The base station 230 may transfer traffic between the user device 240 (e.g., using a cellular RAT), one or more base stations (e.g., using a wireless interface or a backhaul interface, such as a wired backhaul interface), and/or a core network. The base station 230 may provide one or more cells that cover geographic areas.

The user device 240 includes one or more devices capable of receiving, generating, storing, processing, and/or providing information, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an autonomous vehicle, a robot, an unmanned aerial vehicle (UAV), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
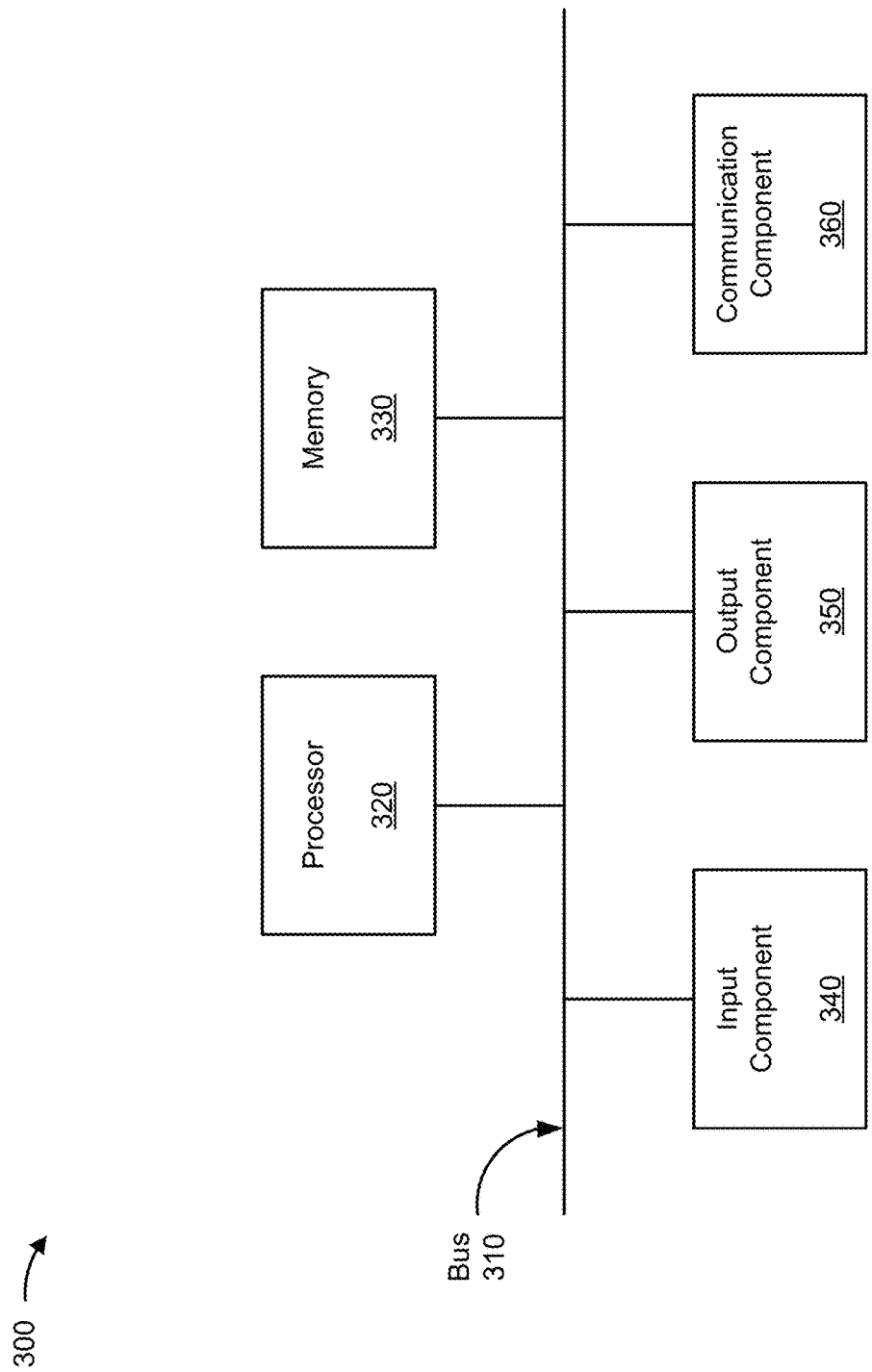
FIG. 3 is a diagram of example components of one or more devices of FIG. 2.

FIG. 3 is a diagram of example components of a device 300, which may correspond to the positioning system 201, the base station 230, and/or the user device 240. In some implementations, the positioning system 201, the base station 230, and/or the user device 240 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for utilizing machine learning models to estimate user device spatiotemporal behavior. In some implementations, one or more process blocks of FIG. 4 may be performed by a device (e.g., the positioning system 201). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving a first type of data identifying measurements associated with user devices and/or base stations of a mobile radio environment (block 410). For example, the device may receive a first type of data identifying measurements associated with user devices and/or base stations of a mobile radio environment, as described above. In some implementations, the first type of data includes one or more of geographical mapping data associated with the mobile radio environment, obstruction data associated with the mobile radio environment, or event data identifying events associated with the user devices.

As further shown in FIG. 4, process 400 may include receiving a second type of data identifying spatiotemporal behavior associated with the user devices of the mobile radio environment (block 420). For example, the device may receive a second type of data identifying spatiotemporal behavior, such as locations and trajectories, associated with the user devices of the mobile radio environment, as described above. In some implementations, the second type of data includes spatiotemporal behavior generated by other systems and including attributes to be correlated.

As further shown in FIG. 4, process 400 may include training a first model, with the first type of data, to generate a trained first model that yields dimensionality-reduced spatiotemporal characteristics of the first type of data (block 430). For example, the device may train a first model, with the first type of data, to generate a trained first model that yields dimensionality-reduced spatiotemporal characteristics of the first type of data, as described above. In some implementations, the dimensionality-reduced spatiotemporal characteristics facilitate storage and sharing of the dimensionality-reduced spatiotemporal characteristics between network devices of the mobile radio environment. In some implementations, the first model identifies and preserves spatiotemporal patterns in the first type of data, and the first model is one of a neural network model or an auto-encoder model.

As further shown in FIG. 4, process 400 may include training a second model, with the second type of data and the dimensionality-reduced spatiotemporal characteristics, to generate a trained second model (block 440). For example, the device may train a second model, with the second type of data and the dimensionality-reduced spatiotemporal characteristics, to generate a trained second model, as described above. In some implementations, the first model and the second model are jointly trained, or the first model is separately trained first and the second model is separately trained after the first model is trained.

As further shown in FIG. 4, process 400 may include receiving particular data identifying measurements associated with a user device and/or base stations of the mobile radio environment (block 450). For example, the device may receive particular data identifying measurements associated with a user device and/or base stations of the mobile radio environment, as described above.

As further shown in FIG. 4, process 400 may include processing the particular data, with the trained first model, to generate a dimensionality-reduced spatiotemporal characteristic of the particular data (block 460). For example, the device may process the particular data, with the trained first model, to generate a dimensionality-reduced spatiotemporal characteristic of the particular data, as described above.

As further shown in FIG. 4, process 400 may include processing the dimensionality-reduced spatiotemporal characteristic, with the trained second model, to predict a spatiotemporal behavior of the user device (block 470). For example, the device may process the dimensionality-reduced spatiotemporal characteristic, with the trained second model, to predict a spatiotemporal behavior of the user device, as described above. In some implementations, the spatiotemporal behavior of the user device includes one of a geolocation of the user device at a particular time, a trajectory of the user device through space and time, a velocity of the user device at a particular time, an acceleration of the user device at a particular time, an orientation of the user device at a particular time, a height of the user device at a particular time, or a bearing of the user device at a particular time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
receiving, by a device, a first type of data identifying measurements associated with user devices and/or base stations of a mobile radio environment,
wherein the first type of data includes one or more of:
geographical mapping data corresponding to the mobile radio environment,
obstruction data corresponding to the mobile radio environment, or
event data identifying events corresponding to the user devices;
receiving, by the device, a second type of data identifying spatiotemporal behavior associated with the user devices of the mobile radio environment;
training, by the device, a first model, with the first type of data, to generate a trained first model that yields dimensionality-reduced spatiotemporal characteristics of the first type of data;
training, by the device, a second model, with the second type of data and the dimensionality-reduced spatiotemporal characteristics, to generate a trained second model;
receiving, by the device, particular data identifying measurements associated with a user device and/or one or more base stations of the mobile radio environment;

processing, by the device, the particular data, with the trained first model, to generate a dimensionality-reduced spatiotemporal characteristic of the particular data; and processing, by the device, the dimensionality-reduced spatiotemporal characteristic of the particular data, with the trained second model, to predict a spatiotemporal behavior of the user device.

2. The method of claim 1, wherein the second type of data includes spatiotemporal behavior generated by other systems and including attributes to be correlated.

3. The method of claim 1, wherein the first model and the second model are jointly trained, or
wherein the first model is separately trained first, and the second model is separately trained after the first model is trained.

4. The method of claim 1, wherein the spatiotemporal behavior includes at least one of:
a geolocation of the user device at a particular time,
a trajectory of the user device through space and time,
a velocity of the user device at a particular time,
an acceleration of the user device at a particular time,
an orientation of the user device at a particular time,
a height of the user device at a particular time, or
a bearing of the user device at a particular time.

5. The method of claim 1, wherein the dimensionality-reduced spatiotemporal characteristics facilitate storage and sharing of the dimensionality-reduced spatiotemporal characteristics between network devices of the mobile radio environment.

6. The method of claim 1, wherein the first model identifies and preserves spatiotemporal patterns in the first type of data, and
wherein the first model is one of a neural network model or an auto-encoder model.

7. A device, comprising:
one or more memories; and
one or more processors, coupled to the one or more memories, configured to:
receive a first type of data identifying measurements associated with user devices and/or base stations of a mobile radio environment,
wherein the first type of data includes one or more of:
geographical mapping data corresponding to the mobile radio environment,
obstruction data corresponding to the mobile radio environment, or
event data identifying events corresponding to the user devices;
receive a second type of data identifying spatiotemporal behavior associated with the user devices of the mobile radio environment;
train a first model, with the first type of data, to generate a trained first model that yields dimensionality-reduced spatiotemporal characteristics of the first type of data;
train a second model, with the second type of data and the dimensionality-reduced spatiotemporal characteristics, to generate a trained second model;
receive particular data identifying measurements associated with a user device and/or one or more base stations of the mobile radio environment;
process the particular data, with the trained first model, to generate a dimensionality-reduced spatiotemporal characteristic of the particular data; and
process the dimensionality-reduced spatiotemporal characteristic of the particular data, with the trained second model, to predict a spatiotemporal behavior of the user device.

8. The device of claim 7, wherein the second type of data includes spatiotemporal behavior generated by other systems and including attributes to be correlated.

9. The device of claim 7, wherein the one or more processors, to train the first model and the second model, are configured to:
jointly train the first model and the second model, or
train the second model after the first model is trained.

10. The device of claim 7, wherein the spatiotemporal behavior includes at least one of:
a geolocation of the user device at a particular time,
a trajectory of the user device through space and time,
a velocity of the user device at a particular time,
an acceleration of the user device at a particular time,
an orientation of the user device at a particular time,
a height of the user device at a particular time, or
a bearing of the user device at a particular time.

11. The device of claim 7, wherein the dimensionality-reduced spatiotemporal characteristics facilitate storage and sharing of the dimensionality-reduced spatiotemporal characteristics between network devices of the mobile radio environment.

12. The device of claim 7, wherein the first model identifies and preserves spatiotemporal patterns in the first type of data, and
wherein the first model is one of a neural network model or an auto-encoder model.

13. A non-transitory computer-readable medium storing a set of instructions, the set of instructions comprising:
one or more instructions that, when executed by one or more processors of a device, cause the device to:
receive a first type of data identifying measurements associated with user devices and/or base stations of a mobile radio environment,
wherein the first type of data includes one or more of:
geographical mapping data corresponding to the mobile radio environment,
obstruction data corresponding to the mobile radio environment, or event data identifying events corresponding to the user devices;
receive a second type of data identifying spatiotemporal behavior associated with the user devices of the mobile radio environment;
train a first model, with the first type of data, to generate a trained first model that yields dimensionality-reduced spatiotemporal characteristics of the first type of data;
train a second model, with the second type of data and the dimensionality-reduced spatiotemporal characteristics, to generate a trained second model;
receive particular data identifying measurements associated with a user device and/or one or more base stations of the mobile radio environment;
process the particular data, with the trained first model, to generate a dimensionality-reduced spatiotemporal characteristic of the particular data; and
process the dimensionality-reduced spatiotemporal characteristic of the particular data, with the trained second model, to predict a spatiotemporal behavior of the user device.

14. The non-transitory computer-readable medium of claim 13, wherein the second type of data includes spatiotemporal behavior generated by other systems and including attributes to be correlated.

15. The non-transitory computer-readable medium of claim 13, wherein, to cause the device to train the first model and the second model, the one or more instructions cause the device to:
jointly train the first model and the second model, or
train the second model after the first model is trained.

16. The non-transitory computer-readable medium of claim 13, wherein the spatiotemporal behavior includes at least one of:
a geolocation of the user device at a particular time,
a trajectory of the user device through space and time,
a velocity of the user device at a particular time,
an acceleration of the user device at a particular time,
an orientation of the user device at a particular time,
a height of the user device at a particular time, or
a bearing of the user device at a particular time.

17. The non-transitory computer-readable medium of claim 13, wherein the dimensionality-reduced spatiotemporal characteristics facilitate storage and sharing of the dimensionality-reduced spatiotemporal characteristics between network devices of the mobile radio environment.

18. The non-transitory computer-readable medium of claim 13, wherein the one or more instructions further cause the device to:
perform one or more actions based on the spatiotemporal behavior,
wherein, to cause the device to perform the one or more actions, the one or more instructions cause the device to at least one of:
optimize handover decisions for the user device,
update one or more of the first model or the second model, or
provide data representing the spatiotemporal behavior to the base station to cause one or more parameters to be adjusted.

19. The method of claim 1, further comprising:
performing one or more actions based on the spatiotemporal behavior,
wherein the one or more actions comprise at least one of:
optimizing handover decisions for the user device,
updating one or more of the first model or the second model, or
providing data representing the spatiotemporal behavior to the base station to cause one or more parameters to be adjusted.

20. The device of claim 7, wherein the one or more processors are further configured to:
perform one or more actions based on the spatiotemporal behavior,
wherein the one or more processors, to perform the one or more actions, are configured to at least one of:
optimize handover decisions for the user device,
update one or more of the first model or the second model, or
provide data representing the spatiotemporal behavior to the base station to cause one or more parameters to be adjusted.

* * * * *